United States Patent
Field

[15] 3,701,515
[45] Oct. 31, 1972

[54] PORTABLE CUTTING TORCH APPARATUS

[72] Inventor: William J. Field, New Westminster, British Columbia, Canada

[73] Assignee: Fields Industrial Research (1971) Ltd, Vancouver, British Columbia, Canada

[22] Filed: June 7, 1971

[21] Appl. No.: 150,582

[52] U.S. Cl. ............266/23 K, 266/23 L, 266/23 M
[51] Int. Cl. .............................................B23k 7/02
[58] Field of Search .................266/23 K, 23 L, 23 M

[56] References Cited

UNITED STATES PATENTS

| 2,801,098 | 7/1957 | Plumb | 266/23 L |
| 2,886,305 | 5/1959 | Strahan | 266/23 K |
| 3,591,156 | 7/1971 | England | 266/23 L |
| 3,596,892 | 8/1971 | Nakanishi | 266/23 M |

*Primary Examiner*—Frank T. Yost
*Attorney*—Lyle G. Trorey

[57] ABSTRACT

A portable cutting torch apparatus having a casing adapted to be supported over a work piece, the casing having a vertical spindle mounted for rotation therein and through which fuel gasses are fed under pressure to a cutting torch connected at a lower end of but offset from the spindle axis. A motor driven by oxygen is connected to the spindle for rotating the latter when oxygen is fed to the cutting torch.

7 Claims, 9 Drawing Figures

PATENTED OCT 31 1972 3,701,515
SHEET 3 OF 6
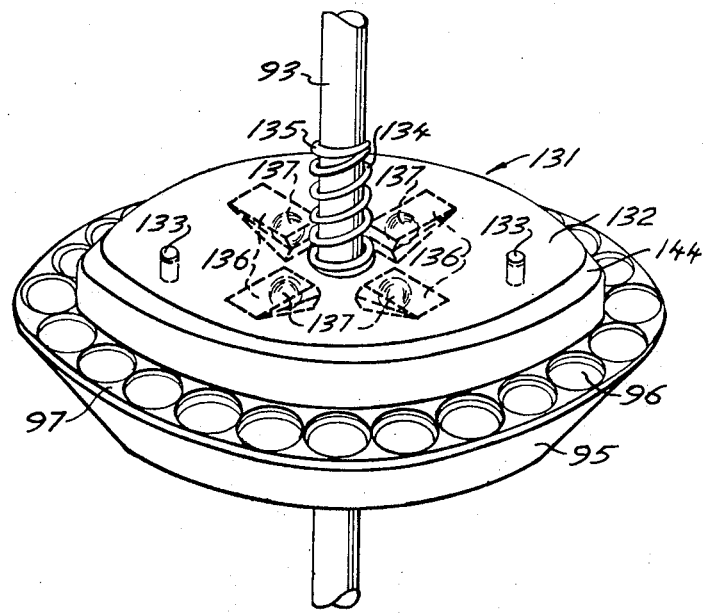
-Fig. 4-
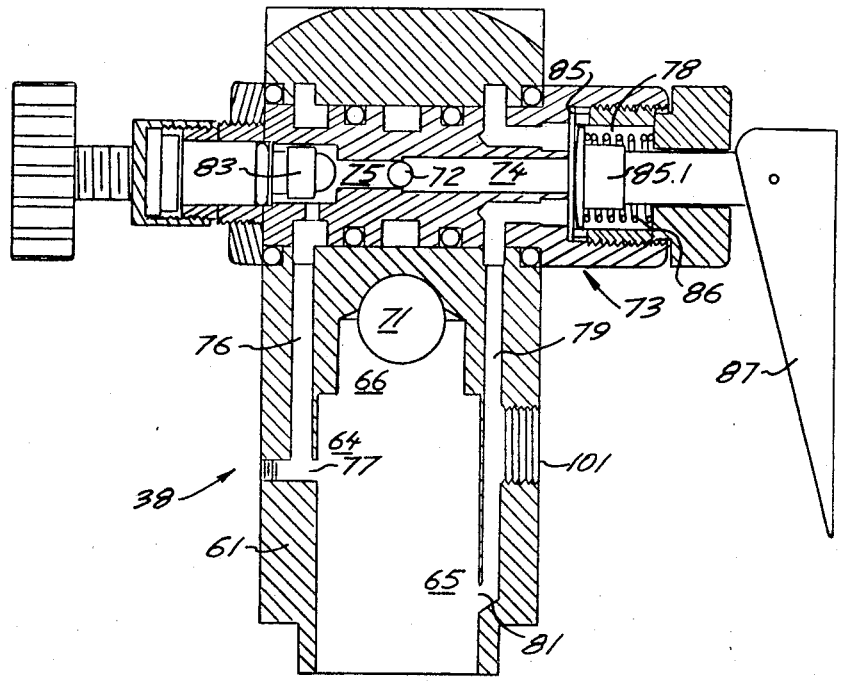
-Fig. 3-
William J. Field,
Inventor
by
Lyle G. Trorey,
Agent

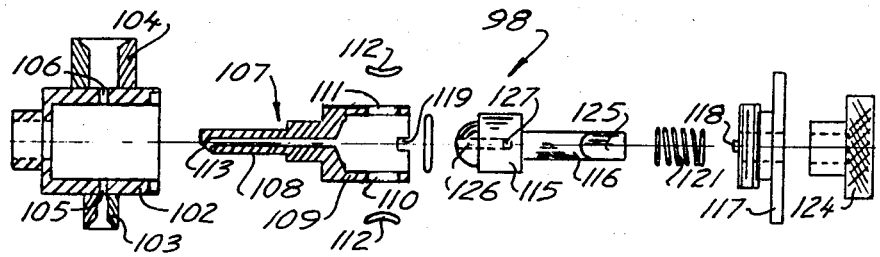
-Fig. 5-
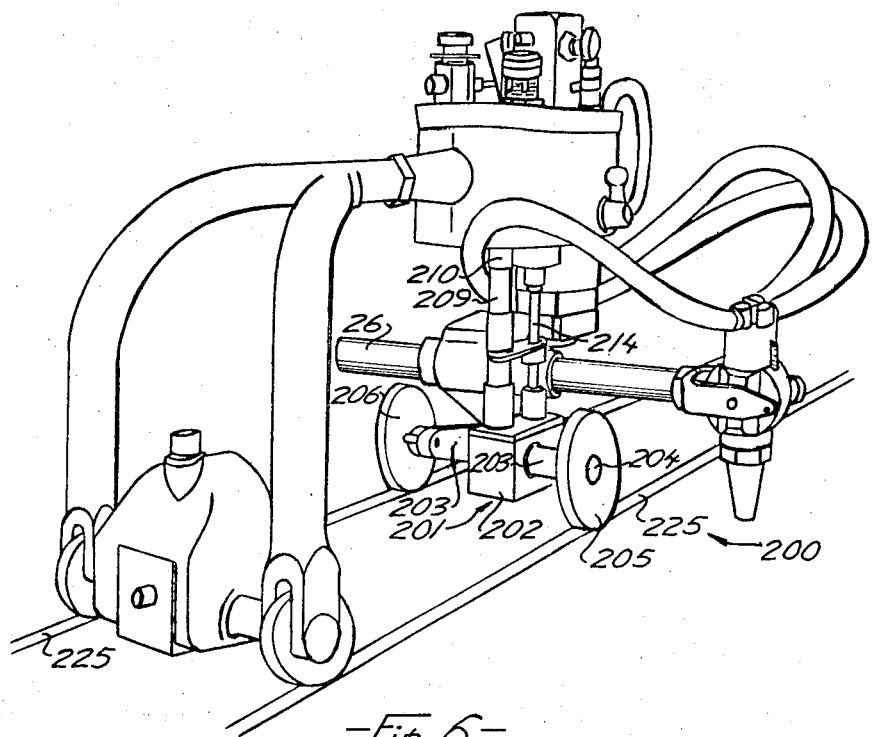
-Fig. 6-
William J. Field,
Inventor
by
Lyle G. Trorey,
Agent William J. Field, Inventor
by Lyle G. Torey, Agent

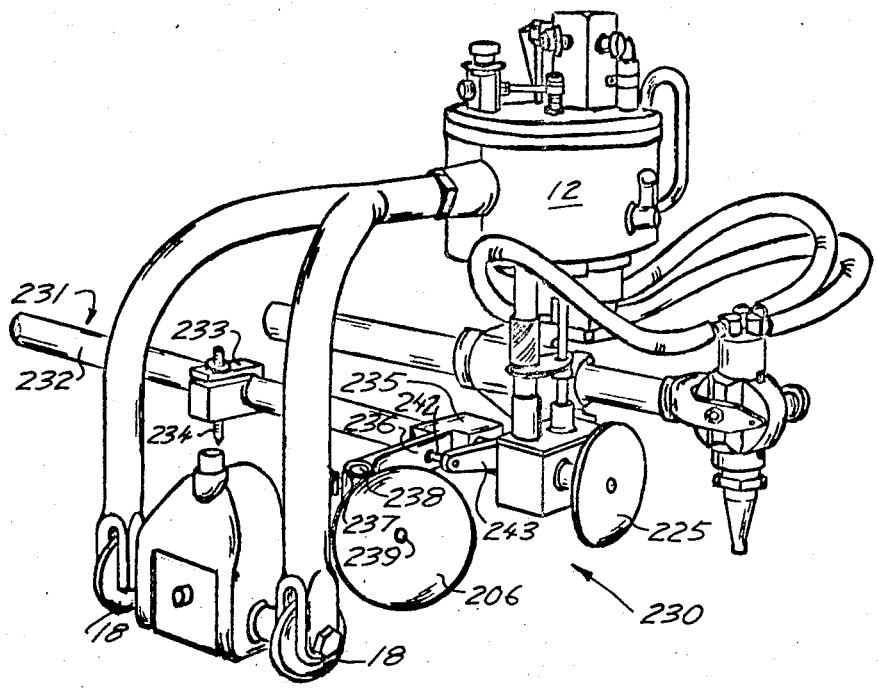
Fig. 8
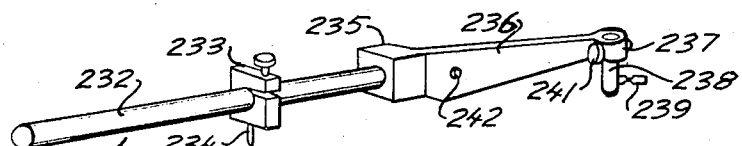
Fig. 9
William J. Field, Inventor
by 
Lyle G. Trorey, Agent spindle. The arm 26 can be clamped in varied positions of adjustment by a clamping knob 46 which extends through the sleeve. The lower leg 32 of the carrier piece has a vertically extending socket 47 in which a sleeve 48 is clamped by a clamping knob 49, the sleeve slidably receiving the centering point 33. The centering point can be moved vertically of the sleeve and clamped in any desired position by means of a set screw 51 so that the torch can be adjusted for elevation over a work piece to be cut.

The torch 28 which is of conventional construction has orifices, not shown, through which heating oxygen, cutting oxygen and fuel gas, for example acetylene, can be directed onto the work piece. Gasses are fed to the torch through conduits, severally 53 each of which is connected through suitable fittings, not shown, fastened to the enlargement 43 the spindle. The fittings communicate with gas passages 54, 55, and 56 which are closed at lower ends and which extend longitudinally of the spindle.

The gas valve 38, see FIGS. 2 and 3, has a cap 61 which is bolted to the cover plate 13 and which receives an upper end portion 62 of the spindle. O-rings, severally 63 are fitted in axially spaced relationship over the upper end portion of the spindle 62 providing sealing engagement with the cap and form sealed annular chambers 64 and 65 and an upper end chamber 66. The passage 54 which carries acetylene to the torch opens into the upper end chamber 66. The passage 55 which carries heating oxygen to the torch is closed at its upper end and is ported at 67 into annular chamber 64. The passage 66 which carries cutting oxygen is ported at 68 into the annular chamber 65. The upper end chamber 66 has a fitting 71 which can be connected to an acetylene bottle so as to deliver acetylene via the gas passage 54 to the torch. Oxygen from an oxygen bottle is delivered via a gas fitting 72 into the cap whence it is distributed by a valve arrangement 73, see FIG. 3, to either of the annular chambers 64, 65.

The valve arrangement 73 has a transverse passage 74 opening at one end 75 into a vertical passage 76 which is ported at 77 into the annular chamber 64. The passage 74 communicates at its other end with a valve chamber 78, the valve chamber communicating via a passage 79 and a port 81 with the annular chamber 65. The gas fitting 72, it is seen, provides oxygen centrally into the transverse passage 74. Delivery of oxygen from the passage 74 to the annular chamber 64 is controlled by a manually operated valve 83. The valve chamber 78 has a diaphragm 85 which is normally urged to a closed position over passages 74 and 79 by a plunger 85.1 operated by a compression spring 86. A hand operated lever 87 is connected to the plunger for moving the latter away from the diaphragm so as to permit oxygen flow from the passage 74 and through the passage 79 into the annular chamber 65. It is seen that with the above arrangement the valve 38 can be operated so as to deliver oxygen and acetylene to the torch for initially heating the metal plate to be cut and then the plunger 85.1 operated to admit cutting oxygen to the torch.

FIGS. 2, 3, 4, and 5

The apparatus 10 includes a gas driven motor 91, FIG. 2, mounted inside the casing. The motor is mounted in a motor housing 92 bolted to the cover plate inside the casing and includes a vertical drive shaft 93 suitably mounted in bearings 94 for rotation. A turbine plate 95 which has a plurality of peripherally disposed pockets 96, see FIGS. 2 and 4, in an upper face 97, is fixedly mounted on the drive shaft. The turbine plate is driven by oxygen delivered through a blow pipe assembly 98 mounted on the cover plate. The blow pipe assembly is connected via a pipe 99 and port 101, see FIG. 3, in the cap to the cutting oxygen passage 79.

FIG. 5

The blow pipe assembly 98 has a socket member 102 screw fitted into a suitably tapped hole in the cover plate of the casing. The socket member is provided with a pair of diametrically opposed gas fittings 103 and 104 secured into ports 105 and 106, respectively. Fitting 103 is connected to the oxygen pipe 99 whereas fitting 104 can be connected to a source of compressed air if such is available. A tubular blow pipe proper 107 having an elongated stem 108 and an upper socketed head 109 fits in the socket member 102, the head of the blow pipe having diametrically opposed ports 110 and 111 can register with either of the ports 105 and 106 sealing being provided by the O-rings 112. The stem has a discharge end 113 through which oxygen is discharged laterally. The head 109 of the blow pipe rotatably receives a cylindrical valve core 115 mounted at a lower end of an operating shaft 116 which extends upwards through a peripherally knurled exteriorly threaded nut 117 which has a threaded connection with the socket member 102, the nut having a downwardly projecting dog 118 having a slidable fit in a notch 119 in the head 109 of the stem. A compression spring 121 fitted over the shaft 116 between the nut 117 and the valve core 115 maintains the valve core seated firmly within the socketed head 109. An adjusting knob 124 is secured over a squared upper end portion 125 of the shaft 116. The core 115 has a blind axial bore 126 communicating with the tubular stem 108. The bore 126 opens at an upper end out of a port 127 in the valve core 115. The port 127 can register with either of the ports 110 and 111 when the core is rotated through 180°.

The valve core 115, it is seen, can be rotated by suitably operating the knob 124 so that the port 127 can be brought into registry with either of the ports 105 and 106 so as to direct oxygen or compressed air into the casing. The blow pipe proper can also be rotated 180° by suitable operation of the nut 117 so that a gas jet issuing from the stem can be disposed to drive the turbine plate in either direction.

FIGS. 2 and 4

Rotational speed of the turbine plate is regulated by a governor assembly 131. The assembly 131 includes a governor plate 132 which slidably and rotatably embraces the drive shaft and which has driven connection with the turbine plate via dowels 133. A compression spring 134 which fits on the drive shaft under compression between a snap ring 135 and the governor plate urges the latter downwards against the turbine plate. Four radially extending grooves 136 are formed in the adjoining faces of the governor and turbine plates, the grooves being arranged in complimental relationship so as to provide four outwardly tapering pockets each of 3,701,515

PORTABLE CUTTING TORCH APPARATUS

BACKGROUND OF THE INVENTION

1. Field of the Invention

This invention relates to portable cutting torch apparatus and carriage and more particularly to apparatus which uses compressed oxygen for moving the cutting torch nozzle during a cutting operation.

2. Prior Art

There are many situations where cuts are to be made in metal plates or metal structures by cutting torches. In shop work where power sources are available for driving carriage mounted cutting torches or for driving turntables on which a metal plate to be cut can be mounted below a stationary torch problems do not usually arise however in field cutting where conditions are usually unknown and where power sources are not readily available difficulties are encountered in the use of carriage mounted torches.

Portable automatically operated carriages have heretofore been devised for this work however they have not been, in the main, entirely successful as they have been cumbersome to transport and operate and in many cases have to depend, for their travelling operation on electric power sources. This either requires an available power source on the job or a portable generator which adds to the cost of cutting operation. Difficulties are also experienced with most portable prior art cutting equipment particularly in respect of adjustability for circular cutting.

SUMMARY OF THE INVENTION

The present invention provides cutting torch apparatus which is highly portable, easy to operate and which can use, as a source of motor power, pressurized oxygen normally used in conjunction with acetylene or other fuel gasses in the cutting operation.

The apparatus of the present invention furthermore is quickly and easily adaptable for cutting axis of varied radii or for a straight line cutting operation.

The apparatus of the present invention has a casing adapted to be supported over a plate to be cut, a spindle extending vertically through the casing having a cutting torch mounted at and eccentrically of the lower end thereof, a centering point removably secured at a lower end of the spindle on the spindle axis, rotary gas seal at an upper end of the spindle adapted to be connected to a source of fuel gas and oxygen, the spindle having passages through which the gasses can pass to the torch, a turbine mounted in the casing adapted to be driven by oxygen bypassed from oxygen supply to the torch, transmission means connecting the turbine and spindle for rotating the latter so that the torch is rotated about the spindle axis.

The apparatus also includes means to disconnect the transmission means from the spindle, a power take-off means connected to the turbine, a carriage connectable to the casing for supporting the latter for movement over the plate to be cut having wheels connectable to the power take-off means for moving the carriage so as to make a straight line cut.

The apparatus also includes a radius rod securable to the casing at one end and having an adjustable centering point adjustable longitudinally of the rod, said centering point acting as center about which the carriage can move so that the apparatus can travel in an arc of large radius.

DESCRIPTION OF THE DRAWINGS

FIG. 3 is an enlarged sectional view of a gas valve of the embodiment shown in FIG. 2, FIG. 4 is a sectional view of a portion of a motor of embodiment shown in FIG. 1, FIG. 5 is an enlarged exploded view, partially in section of a gas jet assembly for driving the motor, FIG. 6 is a perspective of another embodiment of the invention adapted for cutting in a straight line operation, FIG. 8 is a perspective of yet another embodiment of the invention adapted to cut arcs of large radius, FIG. 9 is a perspective of a radius rod used in the embodiment of the invention shown in FIG. 8.

DETAIL DESCRIPTION

FIGS. 1, 2, 3, 4, and 5

Figure 1:
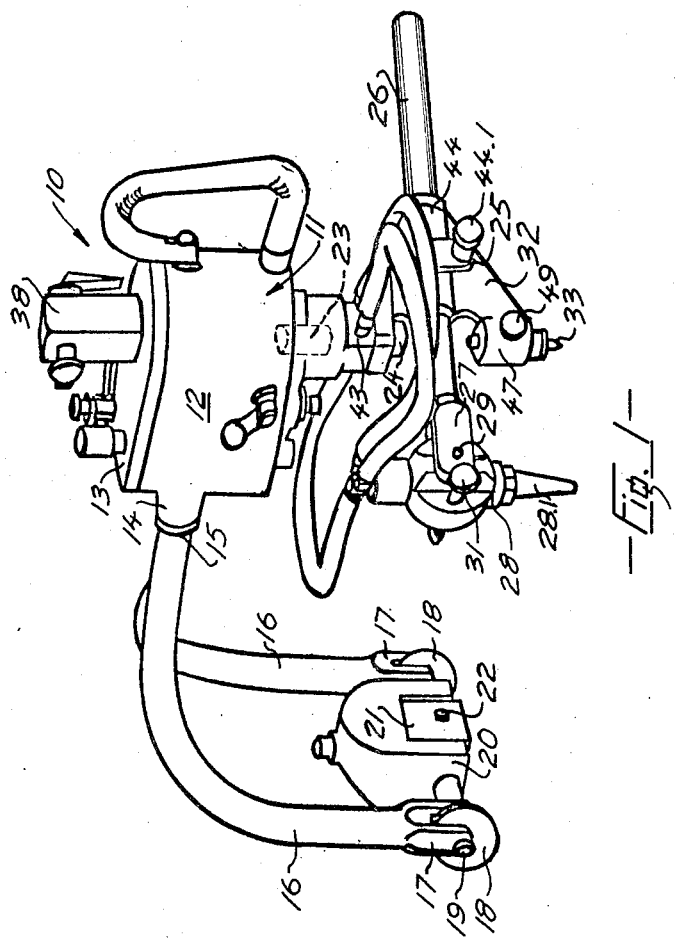
FIG. 1 is a perspective of one embodiment of the cutting torch apparatus arranged for cutting circles of small radius.

Referring to FIG. 1 as showing one embodiment 10 of cutting torch apparatus. Apparatus 10 has a casing 11 having a lower section 12 and a cover plate 13 bolted thereon. The casing has an aft threaded socket 14 for threaded engagement with a threaded end piece 15 of a pair of curved tubular arms 16, the arms being forked at lower ends 17 for receiving rollers 18. The rollers are mounted on stub-shafts 19 of a magnet housing 20 carrying a permanent magnet 21, the magnet being of a well known type controlled by an on-off switch 22.

Figure 2:
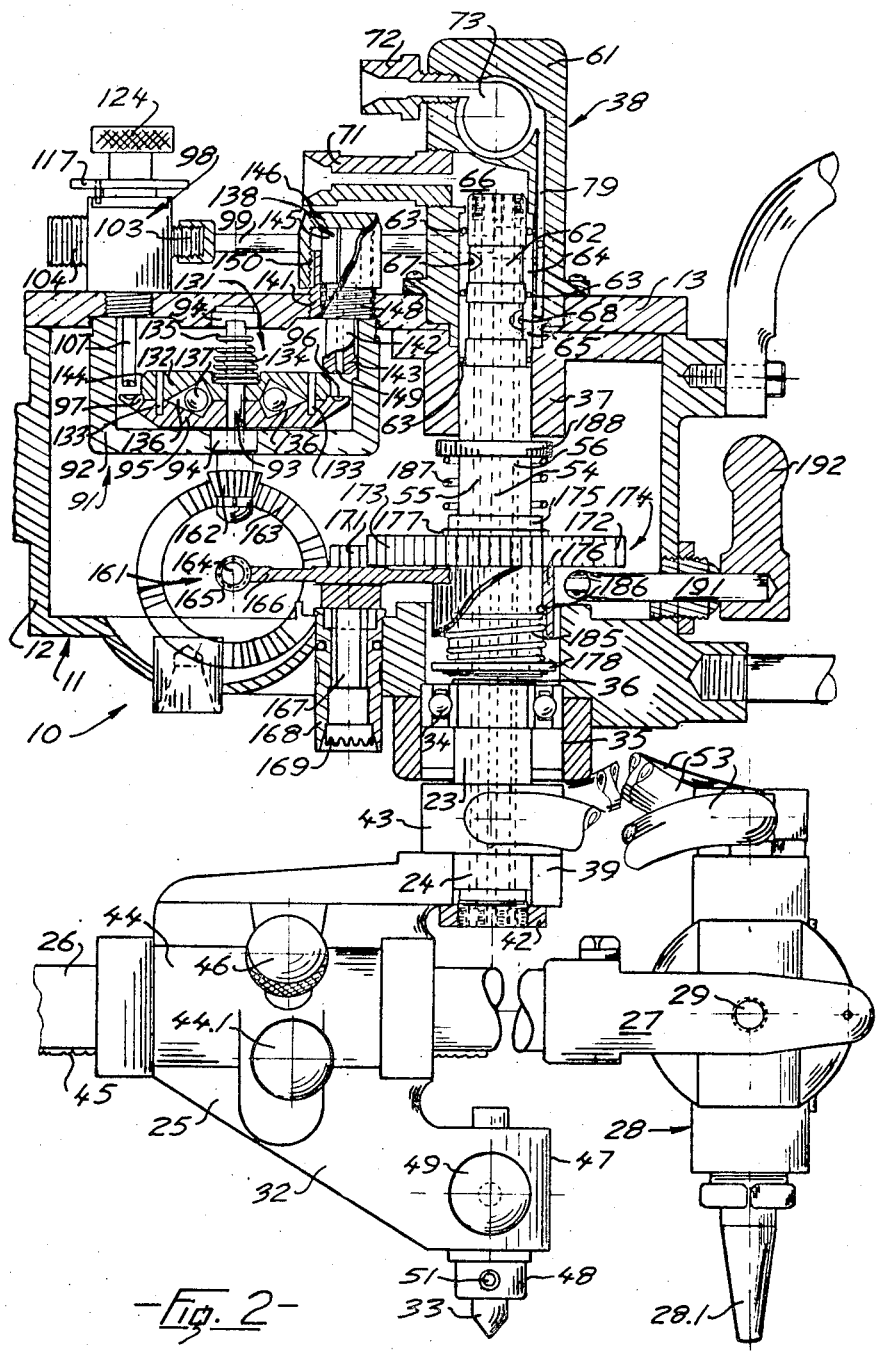
FIG. 2 is an enlarged sectional view of a portion of the embodiment shown in FIG. 1.

A spindle 23, see also FIG. 2, extends vertically through the casing and has connected at its lower end 24, a carrier piece 25 in which a horizontal arm 26 is mounted for lateral adjustment, the arm having a forked end 27. A conventional cutting torch 28 having a conventional tip 28.1 is mounted on a transverse shaft 29 extending through the forked end, the torch being angularly adjusted and clamped by means of an adjusting knob 31. The carrier piece has a lower leg 32 which carries a centering point 33 being spaced below and in alignment with the spindle 23. It is seen that the rollers 18 and centering point provide three point support for the apparatus.

FIG. 2

The spindle 23 extends through a bearing 34 which has a press fit in a socket 35 in the lower portion of the casing. A snap ring 36 fits on the spindle and bears against the bearing 34. The spindle extends through a sleeve bearing 37 secured to the cover plate 13 of the casing into a gas valve 38 which is bolted to the cover plate.

The carrier piece 25 has a socket 39 which non-rotatably fits over a lower end portion 24 of the spindle and is secured thereon by a nut 42 threaded on said lower end portion, the socket being tightened against an enlargement 43 of the spindle. The carrier piece also has a horizontal sleeve 44 for slidably receiving the arm 26, the arm 26 having a gear rack 45 which is engaged by a pinion not shown operated by an adjusting knob 44.1 so that the arm can be adjusted laterally of the which contains a ball weight, severally 137. The governor assembly also includes, FIG. 2, a frictional braking device 138 which is mounted on the cover plate of the casing and extends into the motor housing to frictionally engage the governor plate. The brake device has a sleeve 141 which is screwed into the cover plate and which slidably receives a cylindrical shaft 142 having an enlarged lower head 143 disposed above a peripheral champhered edge 144 of the governor plate. The shaft has an enlarged upper head 145 which slidably fits inside of a cap 146 having a threaded connection with the sleeve 141. A compression spring 148 extends between a lower shoulder on the sleeve and the upper head 145 normally urging the shaft upwards against the cap. Vertical adjustment of the shaft is obtained by suitable adjustment of the cap so that the lower head 143 of the shaft can be vertically adjusted relative to the champhered edge of the governor plate. An axial bore 149 extends through and opens out of opposite ends of the shaft so that gas delivered into the motor housing through the blow pipe exhausts through the bore and through grooves 150 in the sleeve to atmosphere.

When the turbine is rotated the ball weights tend to move radially outwardly and consequently lift the governor plate against the compression spring into frictional engagement with the lower head of the braking device, the frictional force developed thus retarding rotational speed of the turbine. Rotational speed of the turbine is adjusted by corresponding vertical adjustment of the brake device as effected by suitable operation of the cap 146.

It is also to be seen that heat generated by frictional engagement of the governor plate and the lower end of the braking device is dissipated as compressed air or oxygen delivered into the motor housing cools upon expansion and when passing outwards through the shaft of the brake device cools off the lower head thereof. Further, oxygen delivered to drive the turbine plate passes only through the motor housing and not through the interior casing.

The turbine is connected in driven engagement with the spindle through a speed reducing transmission generally 161. As seen in FIG. 2 the drive shaft of the motor extends downwards through the motor housing and has a drive pinion 162 mounted thereon which meshes with a gear 163 the latter mounted on a shaft 164 suitably mounted in the housing. The shaft 164 carries a worm 165 which meshes with a worm gear 166 mounted on a vertical drive shaft 167 the shaft 167 being mounted for rotation in a sleeve 168 opening out of the bottom of the casing. The drive shaft 164 has, at its lower end a dog clutch half 169 and carries at its upper end a pinion 171 which meshes with a bull gear 173 of a bull gear assembly generally 174 mounted on the spindle.

The bull gear assembly has an inner sleeve 175 which has a slidable splined connection with the spindle. An outer sleeve 176 on which the bull gear is mounted has a rotatable and slidable fit on the inner sleeve, upward movement of the outer sleeve relative to the inner sleeve being limited by a snap ring 177. The inner sleeve has a lower flange 178 which serves as a seat for a compression spring 185 mounted over the inner sleeve and which presses upwards under compression against an O-ring 186 which fits around the inner sleeve and within an annular socket of the outer sleeve. Pressure of the compression spring against the O-ring serves to frictionally join the outer and inner sleeves for mutual rotation. The bull gear is maintained in meshing engagement with the pinion 171 by means of a compression spring 187 mounted on the spindle between a collar 188 and an upper end of the inner sleeve. The bull gear can be moved upwards of the shaft against the compression spring and out of meshing engagement with the pinion 171, so as to dissociate the spindle and the motor, by operation of an L-shaped lever 191 which extends through the casing beneath the bull gear, the lever having an operating handle 192.

The drive shaft 167 and clutch half 169, it is seen serve as a power take-off unit which is constantly in engagement with the drive shaft of the turbine plate.

OPERATION

In use of apparatus 10 the centering point 33 is set in a punched hole in the work piece to be cut and the magnet 21 is then made operational to fix the apparatus in position. The spindle and the motor are then dissociated as above described. Oxygen and fuel gas are then admitted as hereinbefore described to the torch so as to heat the work piece. Cutting oxygen is then directed to the torch by suitable operation of the gas valve which automatically directs oxygen to the turbine so as to cause rotation of the latter and thus rotate the spindle. The torch which is off-set from the spindle follows a circular path concentric about the centering point.

It will be appreciated that if a compressed air source is available compressed air can be used as a driving medium for the turbine plate thus conserving the oxygen supply.

Figure 7:
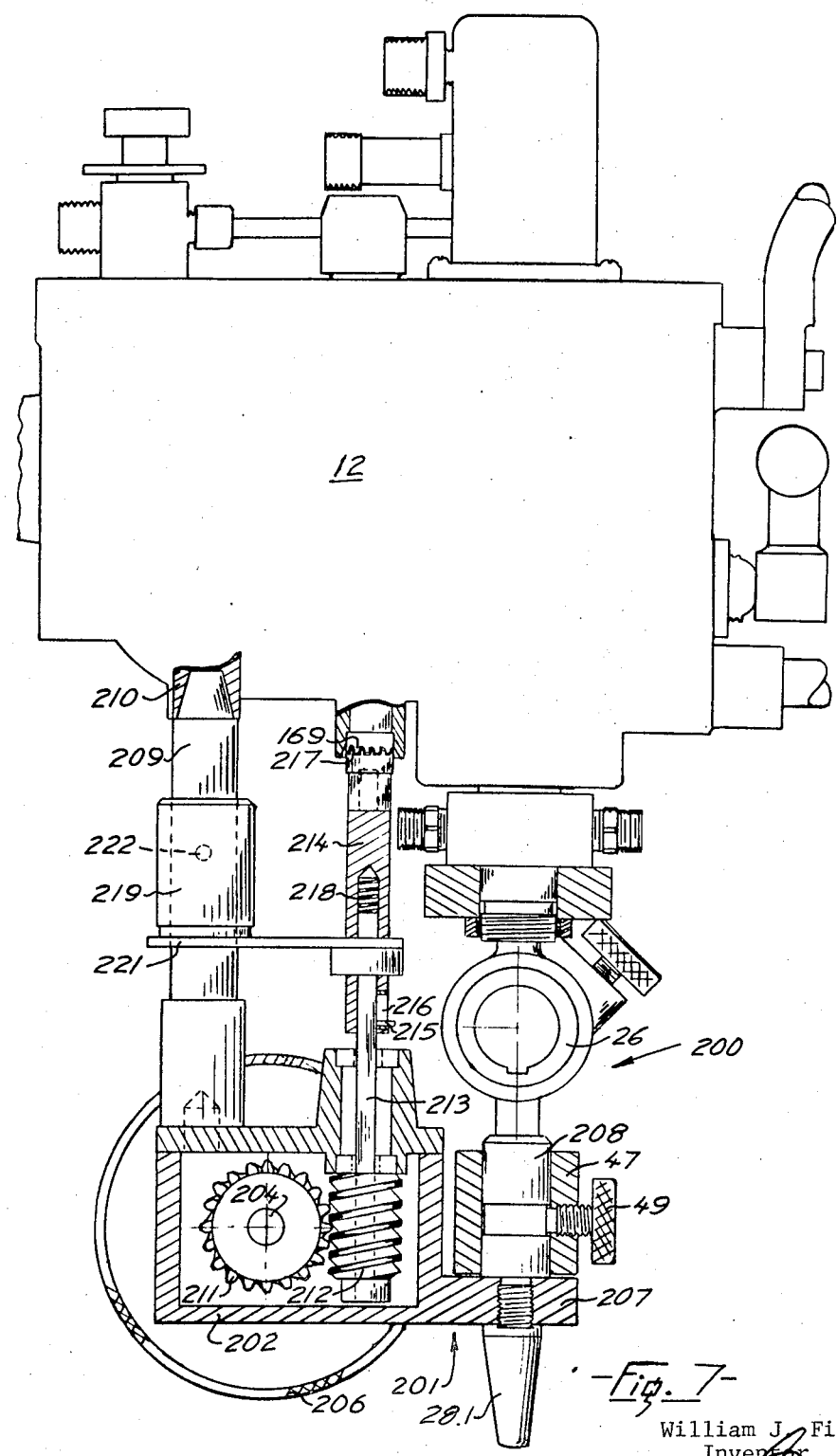
FIG. 7 is an enlarged sectional view of a carriage of the embodiment shown in FIG. 6.

FIGS. 6 and 7

FIGS. 6 and 7 illustrate cutting apparatus 200 being another embodiment of the invention. Apparatus 200 is the same as apparatus 10 but includes a wheeled carriage generally 201 which replaces the centering point 33 arranged so that the apparatus can be used for straight line cutting. Components of apparatus 200 are accorded the same reference numerals as similar components of apparatus 10.

The carriage 201 has an aft housing portion 202 from which project axle housings 203, the axle housings rotatably support an axle 204 on which a pair of wheels 205 and 206 are mounted, wheel 206 is removeably connected to the axle. The carriage has a forward platform portion 207, FIG. 7, which has a vertical upwardly extending stud 208 connected thereto. The housing portion 202 has an upwardly projecting standard 209. The carriage is secured to the casing by fitting the standard 209 into a downwardly opening socket 210 of the casing and the stud 208 is inserted into the socket 47 of the carrier piece 25, — the centering point 33 first being removed — and secured by means of the clamping knob 49. The axle 204 has a worm gear 211 which meshes with a worm 212 at a lower end of a vertical drive shaft 213, the drive shaft extending upwards through the casing. A sleeve 214 fits over an upper end portion of the drive shaft and has a longitudinally slidable but nonrotatable connection thereto by means of a pin 215 which extends from the shaft 213 through a longitudinally extending slot 216 in the sleeve 214. The sleeve has a dog clutch half 217 at its upper end for intermeshing engagement with the clutch half 169 of the power take-off unit. A compression spring 218 extending between the drive shaft 213 and the sleeve 214 normally urges the sleeve 214 upwards of the shaft to effect intermeshing of the dog clutch halves. A sleeve 219 mounted on the standard 209 for slidable movement and connected to the sleeve 214 by an arm 221 is engaged by an outwardly sprung detent 222 on the standard 209 when the clutch halves are intermeshed.

OPERATION

In a straight line cutting operation guide rails 225, FIG. 6, in which the wheels and rollers fit are set out on or alongside the piece to be cut for guiding apparatus 200 along a proposed line of travel. The torch arm 26 is disposed perpendicular to the proposed line of travel, the torch then being adjusted for the type of cut to be made. The magnet, is of course, in an off condition. Heating and cutting procedures as described with reference to operation of apparatus 10 are followed with respect to operation of the apparatus 200. The apparatus 200 like the apparatus 10 remains stationary during heating of the work piece up to cutting temperature but then immediately moves when cutting oxygen is directed to the torch.

FIGS. 8 and 9

FIGS. 8 and 9 show a cutting apparatus 230 being yet another embodiment of the invention which is adapted for cutting arcs of much greater radius than is obtainable with the use of the apparatus 10.

The apparatus 230 is the same, in all respects as apparatus 200 with the exception of a radius rod structure 231, FIG. 9, consequently components of the apparatus 230 which correspond to similar components of apparatus 200 are accorded the same numerical references.

The radius rod structure includes a tubular radius rod 232 which can be ten or fifteen feet in length and on which an adjustable clamp 233 carrying a centering point 234 is mounted, the clamp being adjustable longitudinally of the rod.

The rod 232 terminates at its inner end in a securing block 235 which has a socket, not shown, for receiving the axle housing 203 associated with the wheel 206. The block 235 has a laterally extending arm 236 which terminates in a socket 237 in which a stub shaft 238 is fitted. The stub shaft has a stub axle 239 on which the wheel 206 can be secured. The stub shaft can be rotatably positioned within the socket and clamped in any desired position by a clamping nut 241 extending into the socket.

OPERATION

In setting up the apparatus 230 for a cutting operation the wheel 206 of the carriage is mounted on the axle 239 and the radius rod structure fitted on the axle housing. The arm 236 is then bolted as at 242 to an arm 243 which extends laterally aft of the axle housing thus effecting a substantial rigid connection of the radius rod structure to the carriage. The wheels 206 and 205 and the centering point 235 it is seen provide three point support for the apparatus 230, the stub shaft 238 being adjusted so that said apparatus is canted slightly forward to lift the rollers 18 off the work piece to be cut. The stub axle 239 is aligned with the centering point 234. The torch arm is positioned so that it extends substantially parallel to the radius rod and the spindle is dissociated from the motor as herebefore described. The centering point can then be seated in a centering hole and apparatus 238 operated as hereinbefore described to commence cutting. The carriage, it is seen, together with the torch travels in a circular path about the centering point.

I claim:
1. Cutting torch apparatus including:
   a. a casing,
   b. a spindle having longitudinally extending gas passages mounted in the casing for rotation about a vertical axis,
   c. a bull gear mounted on the spindle inside the casing for longitudinal slidable movement of the spindle,
   d. a carrier piece connected to a lower end of the spindle for mutual rotation with the latter, the carrier piece having a vertical socket having an axis coinciding with the spindle axis and having a horizontally extending sleeve,
   e. an arm mounted in the sleeve for lateral adjustment,
   f. a cutting torch mounted at one end of the arm having a gas connection to the gas passages at the lower end of the spindle,
   g. a centering point detachably mounted in the socket,
   h. a pair of rollers mounted beneath the casing and disposed so that the rollers and centering point provide three point support for the casing over a work piece to be cut,
   i. a rotary gas seal at an upper end of the spindle for connecting the gas passages to sources of pressurized oxygen and fuel gas for enabling delivery of the oxygen and fuel gas to the cutting torch,
   j. a gas driven motor mounted in the casing having a gas connection with the oxygen supply at the rotary seal,
   k. speed reduction transmission connecting the motor and the bull gear of the spindle so that the spindle rotates the cutting torch about the centering point when oxygen is supplied to the torch to commence a cutting operation.

2. Cutting torch apparatus as claimed in claim 1 in which the motor includes:
   i. a vertical drive shaft mounted in the casing,
   ii. a turbine plate mounted on the drive shaft, the plate having a plurality of peripherally disposed pockets,
   iii. a blow pipe extending into the casing connected at one end to the oxygen supply at the rotary seal and having a discharge end disposed to emit an oxygen jet into the pockets so as to drive the turbine plate,
   iv. a governor plate slidably mounted on the shaft over the turbine plate,
   v. dowels connecting the plates for mutual rotation,
   vi. a compression spring mounted on the shaft over the governor plate normally urging the latter against the turbine plate, vii. outwardly tapering radial grooves formed in adjacent surfaces of both plates, the grooves of the plates being disposed in complimenting joins, viii. a ball weight disposed in each pair of grooves adapted to move radially outward under centrifugal forces when the governor and turbine plates are rotated so as to lift the governor plate upwards of the drive shaft against the compression spring, ix. a friction braking device mounted in the casing above the governor plate for frictionally engaging the latter when it is lifted upon rotation of the drive shaft so as to limit rotational velocity of the turbine plate.

3. Cutting torch apparatus as claimed in claim 2 in which the blow pipe is rotatably adjustable so that the oxygen jet can be directed to drive the turbine plate ahead or in reverse.

4. Cutting torch apparatus as claimed in claim 2 in which the frictional braking device is adjustable away from and towards the governor plate so as to enable adjustment of rotational velocity of the turbine plate.

5. Cutting torch apparatus as claimed in claim 2 in which the frictional braking device has a gas passage for discharging, to atmosphere, oxygen emitted into the casing through the blow pipe.

6. Cutting torch apparatus as claimed in claim 1 including:

l. a lever for moving the bull gear out of engagement with the speed reduction transmission so as to dissociate the motor and the spindle, m. a power take-off unit in driven engagement with the transmission and projecting below the casing, n. a two-wheel carriage connectable to the carrier piece when the centering point is removed, one of the wheels of the carriage being removable, o. a drive shaft connected in driving engagement to the carriage wheels and in driven engagement to the power take-off unit so that the apparatus is moved in a straight line for a straight line cutting operation when oxygen is admitted to the torch to commence a cutting operation.

7. Cutting torch apparatus as claimed in claim 6 including:

p. a radius rod adapted to be connected at one end to the carriage in line with the carriage wheels, q. a centering point adjustable longitudinally of the radius rod, r. an arm extending aft of the radius rod at said one end, s. a socket at an end of the arm, t. a stub shaft having a stub axle for receiving the removable carriage wheel secured in the socket so that the wheels and centering point provide three point support for the apparatus so that when oxygen is admitted to the torch to commence a cutting operation the carriage moves the apparatus in a circle about said last mentioned centering point.

* * * * *